(12) United States Patent
Kawasaki

(10) Patent No.: US 6,915,974 B2
(45) Date of Patent: Jul. 12, 2005

(54) LEVEL WIND MECHANISM FOR A DUAL BEARING REEL

(75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/759,432

(22) Filed: Jan. 20, 2004

(65) Prior Publication Data

US 2004/0144877 A1 Jul. 29, 2004

(30) Foreign Application Priority Data

Jan. 23, 2003 (JP) .................................... 2003-015151

(51) Int. Cl.[7] .............................................. A01K 89/02
(52) U.S. Cl. ...................................... 242/273; 242/279
(58) Field of Search ................................ 242/273, 274, 242/278, 279

(56) References Cited

U.S. PATENT DOCUMENTS 5,139,213 A * 8/1992 Furomoto .................... 242/279
5,833,155 A * 11/1998 Murayama .................. 242/279

FOREIGN PATENT DOCUMENTS

| JP | 11-113461 A | 4/1999 | |
| JP | 11-220986 A | 8/1999 | |
| JP | 11-220986 | * 8/1999 | ................. 242/278 |

* cited by examiner

*Primary Examiner*—Emmanuel Marcelo
(74) *Attorney, Agent, or Firm*—Shinjyu Global IP Counselors, LLP

(57) ABSTRACT

A level wind mechanism includes a spiral shaft, a fishing line guide portion, and a guide member. The spiral shaft extends parallel to a rotational axis of a spool. The fishing line guide portion includes a main member, an engagement member that is provided on the main member and engages with the spiral shaft, and a tubular member that includes a line guide hole. The line guide hole tapers toward the side from which fishing line is paid out.

18 Claims, 5 Drawing Sheets

LEVEL WIND MECHANISM FOR A DUAL BEARING REEL

BACKGROUND OF THE INVENTION

1. Field of the Invention

The present invention relates to a level wind mechanism. More specifically, the present invention relates to a level wind mechanism of a dual bearing reel that winds fishing line onto a spool rotatively mounted to a reel unit mounted to a fishing rod while moving the fishing line in a direction parallel to the rotational axis of the spool.

2. Background Information

A dual bearing reel is generally provided with a level wind mechanism that winds fishing line around a spool while moving the fishing line in a direction along the rotational axis of a spool. The level wind mechanism includes a spiral shaft, a fishing line guide portion, and a guide member. The spiral shaft is rotatively supported by the reel unit on the side of the spool on which the fishing line is paid out. The spiral shaft has spiral grooves in the outer peripheral surface thereof. The fishing line guide portion reciprocally moves along the spiral shaft in synchronization with the rotation of the spool. The guide member guides the fishing line guide portion in a direction along the spiral shaft. In particular, the fishing line guide portion includes a main member, an engagement member, and a tubular member. The engagement member is disposed on the main member and engages the spiral shaft. The tubular member includes a line guide hole formed therethrough from the spool side to the side on which the fishing line is paid out. Japanese Published Patent Application H11-113461, especially FIG. 5 thereof, shows an example of the aforementioned structure.

On the other hand, there are also fishing line guide portions that include a main member, an engagement member, and a regulating portion. The engagement member is disposed on the main member and engages the spiral shaft. The regulating portion is disposed on the main member and regulates the movement of the fishing line in the direction along the rotational axis of the spool. The fishing line is guided from the side on which the fishing line is paid out to the spool side by the regulating portion. Thus, the gap across which the fishing line can move will be reduced so that the fishing line will not be misaligned. Japanese Published Patent Application No. H11-220986, especially FIGS. 3 and 4 thereof, shows an example of this structure.

With the first of the two conventional level wind mechanisms noted above, the fishing line moves within the line guide hole of the fishing line guide portion and becomes misaligned when the fishing line is wound. Thus, with this structure the line wound around the spool may become disfigured or tangled. Due to this problem, with the second of the two conventional level wind mechanisms noted above, the gap across which the fishing line can move is reduced by placing the regulating portion on the fishing line guide portion. Thus the fishing line will be uniformly wound onto the spool. However, in situations in which the regulating portion is placed on the fishing line guide portion, the gap across which the fishing line can move will be reduced, and thus when the fishing line is paid out, a large angle of inclination may be created in the fishing line between the spool and the line guide hole depending upon the position of the fishing line wound around the spool. Due to this configuration, there will be a large amount of resistance on the fishing line in the line guide hole, and it will be difficult for the fishing line to be paid out smoothly.

In view of the above, it will be apparent to those skilled in the art from this disclosure that there exists a need for an improved level wind mechanism for a dual bearing reel. This invention addresses this need in the art as well as other needs, which will become apparent to those skilled in the art from this disclosure.

SUMMARY OF THE INVENTION

An object of the present invention is to provide a level wind mechanism of a dual bearing reel that smoothly winds up and pays out fishing line.

A level wind mechanism for a dual bearing reel in accordance with a first aspect of the present invention winds fishing line onto a reel unit that is rotatively mounted to a reel unit mounted to a fishing rod while moving the fishing line along a direction parallel to the rotational axis of the spool. The level wind mechanism includes a spiral shaft, a fishing line guide portion, and a guide member. The spiral shaft extends in a direction parallel to the rotational axis of the spool, and has spiral grooves in the outer peripheral surface. The spiral shaft is rotatively supported by a reel unit adjacent to the spool. The fishing line guide portion is configured to reciprocally move along the spiral shaft in synchronization with the rotation of the spool at least the when the spool winds the fishing reel. The fishing line guide portion has a main member, an engagement member, and a tubular member. The engagement member is provided on the main member and engages the spiral shaft. The tubular member includes a line guide hole through which the fishing line passes. The line guide hole is formed to taper toward a first side from which the fishing line is paid out. In other words, the line guide hole is larger on the side closer to the spool than the side opposite the spool (lure side). With this structure, the tubular member can be fitted in the main member.

The level wind mechanism for a dual bearing reel in accordance with a second aspect of the present invention is the level wind mechanism of the first aspect, in which the line guide hole is tapered such that its width in a direction parallel to the spiral shaft is smaller on the first side.

With this level wind mechanism for a dual bearing reel, the spiral shaft is rotatively supported by the reel unit adjacent to the spool. The fishing line guide portion reciprocally moves along the spiral shaft synchronous with the rotation of the spool in at least the line winding direction. With this structure, the guide member guides the fishing line guide portion in the direction along the spiral shaft.

Here, the line guide hole is formed into a tapered shape which tapers toward the side from which the fishing line is paid out such that the width in the direction parallel to the spiral shaft on the first side is smaller, i.e. the spool side of the line guide hole is larger than the lure side. Thus, movement of the fishing line on the side from which the fishing line is paid out can be controlled while paying out and winding up the fishing line. With this structure, when the fishing line is wound, it can be led onto the spool in a stable state, and can be uniformly wound onto the spool on any position on the spool at which the fishing line is wound. In addition, when the fishing line is to be paid out, the angle of inclination produced in the fishing line between the spool and the line guide hole can be reduced. Further, resistance applied to the fishing line in the line guide hole can be reduced, regardless of the position from which the fishing line is paid out from spool. Accordingly, the fishing line will be smoothly wound up and paid out.

The level wind mechanism for a dual bearing reel in accordance with a third aspect of the present invention is the level wind mechanism of the first or second aspect, in which the line guide hole is tapered such that its upper inner surface is slanted at a greater angle of inclination than its lower inner surface. Here, the inner peripheral surface of the line guide hole that faces the fishing rod is slanted and formed in a tapered shape such that the side from which the fishing line is paid out is closer to the fishing rod than the spool side. Thus, resistance applied to the fishing line by the inner peripheral surface of the line guide hole that faces the fishing rod can be reduced even if the fishing line is wound onto the spool and the diameter of the wound fishing line grows large.

The level wind mechanism for a dual bearing reel in accordance with a fourth aspect of the present invention is the level wind mechanism of one of the first through third aspects, in which the line guide hole is circular in shape. Here, the line guide hole is formed in a circular shape from the side from which the line is paid out to the spool side. Thus resistance that is applied to the fishing line by the line guide hole can be effectively reduced.

The level wind mechanism for a dual bearing reel in accordance with a fifth aspect of the present invention is the level wind mechanism of the fourth aspect, wherein the ratio of the diameter of the line guide hole on the first side to the diameter on the second side is set to be between 0.2 and, but not including, 0.8. The second side is an opposite side from the first side. Here, in the line guide hole, the ratio of the diameter of the line guide hole on the side from which the fishing line is paid out to the diameter of the line guide hole on the spool side is set to be between 0.2 and, but not including, 0.8. Thus, when the diameter on the side from which the fishing line is paid out is regulated such that movement of the fishing line can be optimally controlled, the diameter on the spool side can be easily set. In this case, the line guide hole can be formed in an optimal tapered shape so long as the axial length of the line guide hole is set according to practical need.

The level wind mechanism for a dual bearing reel in accordance with a sixth aspect of the present invention is the level wind mechanism of the fourth or fifth aspects, in which a ratio of a difference between a diameter of the line guide hole on the first side and a diameter of the line guide hole on the second side from to an axial length of the line guide hole is 0.4 or greater. Here, since the ratio of the radial difference to the axial length is set to be 0.4 or greater, the line guide hole can be formed in a tapered shape so that the resistance applied to the fishing line by the line guide hole can be effectively reduced, even if the fishing line is paid out from any position on the spool. Note that when the ratio is less than 0.4, the tapered shape of the line guide hole will relatively be gentle or too gradual. Accordingly, it will be difficult to sufficiently reduce the resistance produced on the fishing line.

The level wind mechanism for a dual bearing reel in accordance with a seventh aspect of the present invention is the level wind mechanism of any of the first to sixth aspects, in which an inner peripheral surface of the line guide hole is at least partially adapted to be substantially parallel with an axial direction of a fishing rod. Here, the fishing line can be maintained in a stable state on the inner peripheral surface of the line guide hole because the inner peripheral surface of the fishing rod side is at least partially formed approximately parallel with the central axis of the fishing rod.

The level wind mechanism for a dual bearing reel in accordance with an eighth aspect of the present invention is the level wind mechanism of any of the first to seventh aspects, in which the line guide hole is at least partially chamfered. Here, since the line guide hole is chamfered, stress that is concentrated on the fishing line on the peripheral edges of the line guide hole will be released. Further, resistance that is produced on the fishing line on the peripheral edges of the line guide hole can be released, even if the fishing line comes into contact with the peripheral edges of the line guide hole.

The level wind mechanism for a dual bearing reel in accordance with a ninth aspect of the present invention is the level wind mechanism of any of the first to eighth aspects, in which the main member has a screw hole formed therein, and the tubular member has an engagement portion. The tubular member is secured to the main member by a screw member engaging the engagement portion and the screw hole. With this mechanism, the tubular member is secured in the main member by the screw member engaging the engagement portion. Here, the tubular member can be reliably secured in the main member because the tubular member is secured in the main member by the screw member in the engagement portion.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4b is a plan cross-sectional view of the tubular member of the level wind mechanism of the dual bearing reel as viewed from the line V—V in FIG. 4a.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
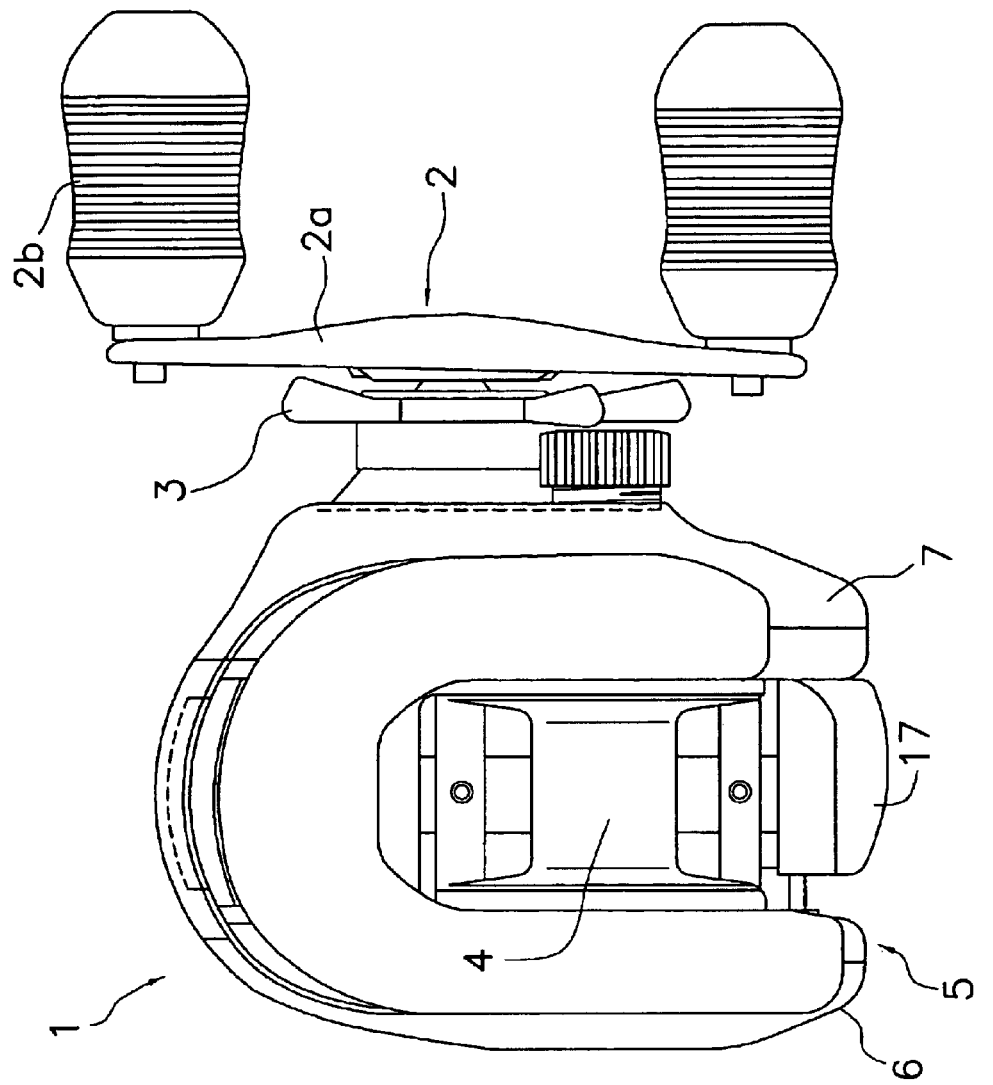
FIG. 1 is a plan view of a dual bearing reel according to a first preferred embodiment of the present invention.

A dual bearing reel in accordance with a preferred embodiment of the present invention is shown in FIG. 1. The dual bearing reel includes a reel unit 1, a handle 2, and a star drag 3 that adjusts drag and is disposed between the reel unit 1 and the handle 2. The handle 2 rotates a spool 4 and is disposed on one side of the reel unit 1.

Figure 2:
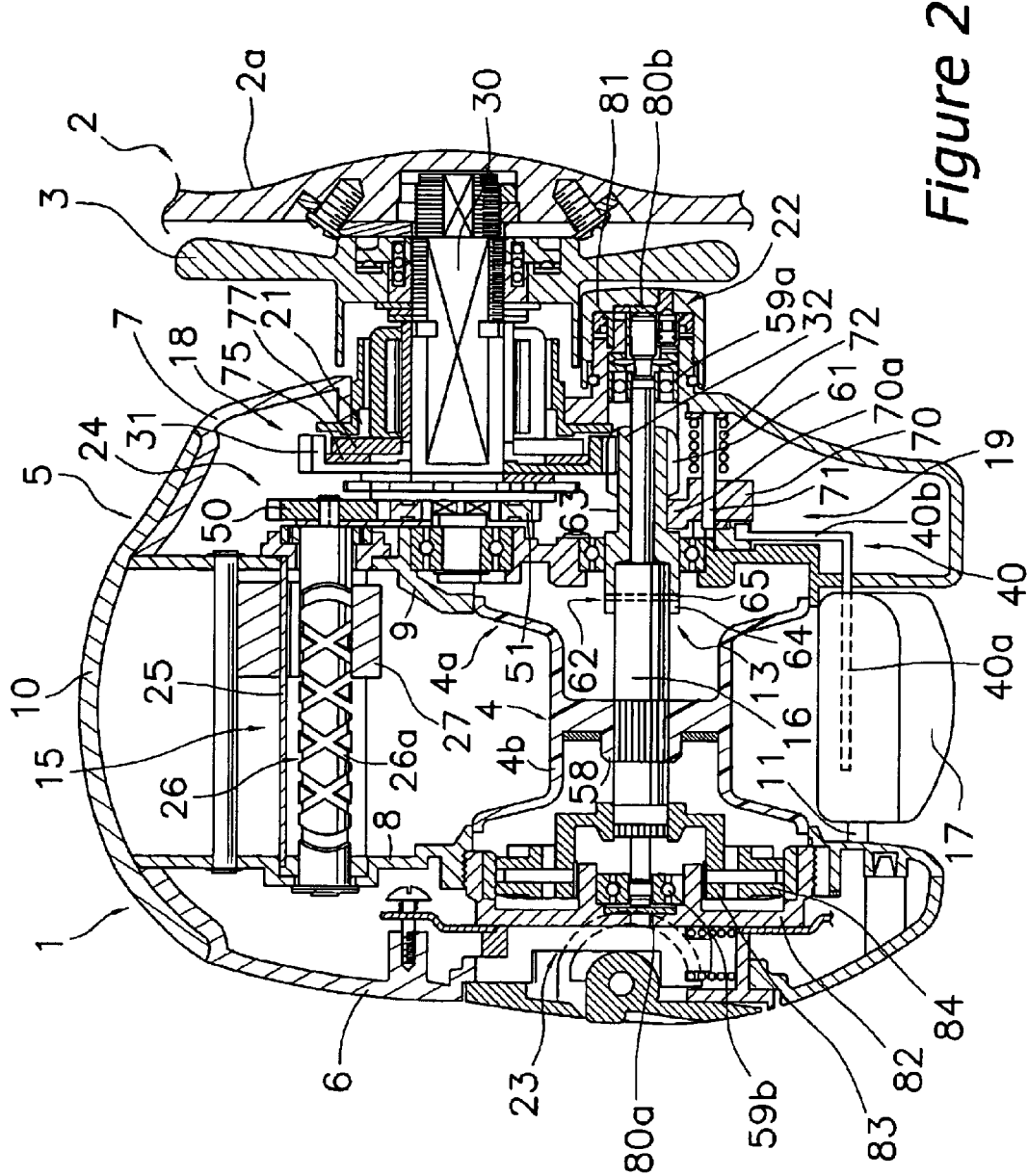
FIG. 2 is a cross-sectional plan view of the dual-bearing reel of FIG. 1.

As shown in FIGS. 1 and 2, the reel unit 1 includes a frame 5, a first side cover 6 and a second side cover 7 disposed on the respective sides of the frame 5, and a front cover 10 that covers the front side of the frame 5. The frame 5 includes a pair of side plates 8 and 9 disposed such that they mutually face each other across a predetermined gap, and a plurality of connectors 11 that connect the side plates 8 and 9. A rod attachment leg 12 (shown in FIG. 5) that extends from front to rear is mounted on the lower side of the connectors 11, and the reel unit 1 is mounted to the fishing rod with the rod attachment leg 12. A spool 4, a level wind mechanism 15, and a clutch lever 17 are disposed inside the frame 5. The level wind mechanism 15 uniformly winds fishing line around the outer periphery of the spool 4. The clutch lever 17 operates the clutch mechanism 13. A rotation transmission mechanism 18, a clutch mechanism 13, a clutch engage/disengage mechanism 19, a drag mechanism 21, and a casting control mechanism 22 are disposed in the space between the frame 5 and the second side cover 7. The rotation transmission mechanism 18 transmits rotational force from the handle 2 to the spool 4. The clutch engage/disengage mechanism 19 serves to engage and disengage the clutch mechanism 13 in response to the operation of the clutch lever 17. The casting control mechanism 22 regulates the resistance when the spool 4 rotates. In addition, a centrifugal braking mechanism 23 that controls backlash during casting is disposed between the frame 5 and the first side cover 6.

As shown in FIG. 2, the spool 4 includes a bobbin trunk 4*b* and flange portions 4*a*. The bobbin trunk 4*b* is formed into a tubular shape, and fishing line is wound around the outer periphery thereof. The flange portions 4*a* are unitarily formed on both ends of the bobbin trunk 4*b* such that the diameters thereof are larger than the outer diameter of the bobbin trunk 4*b*. The flange portions 4*a* are slanted outward toward both ends of the bobbin trunk 4*b*. The spool 4 includes a boss 58 that is unitarily formed therewith in the axial direction on the inner peripheral side of the bobbin trunk 4*b*. Further, the spool 4 is non-rotatably coupled to a spool shaft 16 that passes through the boss 58. The spool shaft 16 passes through the side plate 9 and extends toward the second side cover 7. One end of the spool shaft 16 that extends toward the second side cover 7 is rotatively supported by a bearing 59*a* that is disposed on the second side cover 7. In addition, the other end of the spool shaft 16 is rotatively supported by a bearing 59*b* within the centrifugal brake mechanism 23. These bearings 59*a* and 59*b* are preferably sealed ball bearings.

Figure 5:
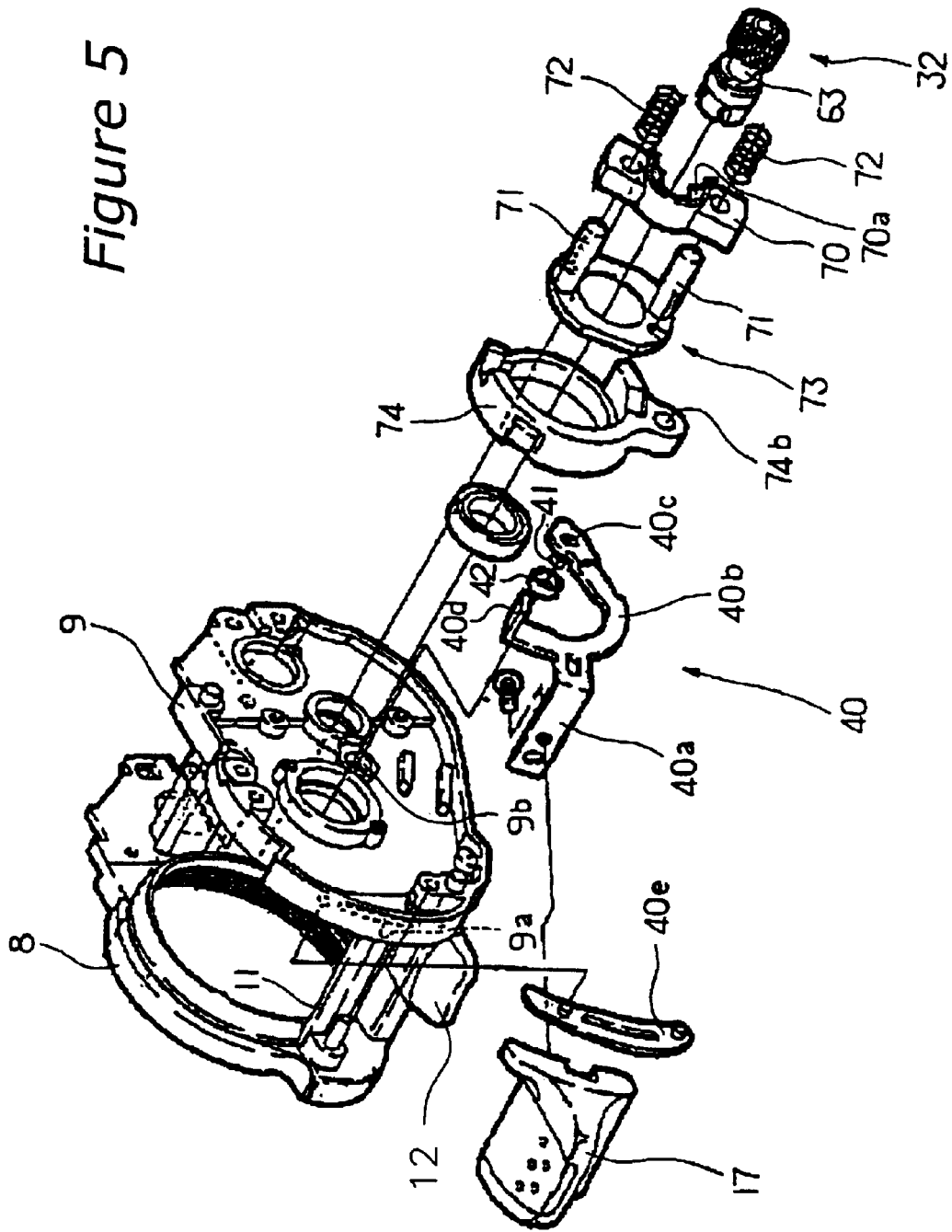
FIG. 5 is an exploded perspective view of a clutch plate of the dual bearing reel.

As shown in FIG. 2, the clutch lever 17 is disposed to the rear of the spool 4 and between the rear portions of the pair of side plates 8 and 9. As used herein, the "rear" direction is the downward direction as seen in FIG. 2. A clutch plate 40 is mounted on the clutch lever 17. As shown in FIG. 5, the clutch plate 40 includes a lever mounting portion 40*a* that is formed into a rectangular plate shape, and a clutch engagement portion 40*b* that is unitarily formed on one end of the lever mounting portion 40*a*. A long hole 9*a* is formed in the side plate 9 of the frame 5, such that the other end of the lever mounting portion 40*a* is inserted into the long hole 9*a*, and the clutch lever 17 is mounted on the lever mounting portion 40*a*. Note that a protective cover 40*e* is mounted between the side plate 9 of the frame 5 and the clutch lever 17. Due to the protective plate 40*e*, it will be difficult for the frame 5 to be damaged when the clutch plate 17 is operated.

As shown in FIGS. 2 and 5, one end of the lever mounting portion 40*a* is bent, and the clutch engagement portion 40*b* is unitarily formed with this bent portion. The clutch engagement portion 40*b* is formed into a C shape. An engagement hole 40*c* is provided in one end of the clutch engagement portion 40*b* and a cam engagement portion 40*d* is provided in the other end thereof. A pin member 41 is non-rotatably coupled to the engagement hole 40*c*. The pin member 41 is pivotably mounted in a plate mounting hole 9*b* formed in the side plate 9 via a bush 42. Thus, the lever mounting portion 40*a* is capable of sliding up and down along the long hole 9*a* using the pin member 41 as a fulcrum. Here, the cam engagement portion 40*d* is engaged with a clutch cam 74. This clutch cam 74 is disposed between the clutch plate 40 and a clutch yoke 70 described below. The clutch cam 74 can rotate about the spool shaft 16. When the lever mounting portion 40*a* of the clutch plate 40 moves downward along the long hole 9*a*, the clutch cam 74 is rotated by the cam engagement portion 40*d*.

As shown in FIG. 2, the rotation transmission mechanism 18 includes a handle shaft 30, a main gear 31, a tubular pinion gear 32, a first gear 50, and a second gear 51. The main gear 31 is fixedly coupled to the handle shaft 30. The tubular pinion gear 32 meshes with the main gear 31. The first gear 50 is fixedly coupled to an end portion of a spiral shaft 26 described below in the description of the structure of the level wind mechanism. The second gear 51 meshes with the first gear 50 and is non-rotatively fixed to the handle shaft 30. The handle shaft 30 is arranged parallel to the spool shaft 16. One end of the handle shaft 30 is non-rotatively supported by the side plate 9, and the other end of the handle shaft 30 is fixedly coupled to the handle 2.

Still referring to FIG. 2, the pinion gear 32 is a tubular member. The spool shaft 16 is capable of passing through the central portion of the pinion gear 32. The pinion gear 32 is mounted on the spool shaft 16 so as to be movable in the axial direction, and rotatively supported by the reel unit 1. The pinion gear 32 disposed as described above includes teeth 61 that mesh with the main gear 31, a mesh portion 62 that meshes with the spool shaft 16, and a neck portion 63 that is formed between the teeth 61 and the mesh portion 62. A groove 64 is formed in the mesh portion 62 along the diameter of an end surface the mesh portion 62. An engagement pin 65 that passes through and is fixedly coupled to the spool shaft 16 can engage with the groove 64. Thus, the clutch mechanism 13 is composed of the mesh portion 62 and the engagement pin 65. With the clutch mechanism 13, when the groove 64 of the pinion gear 32 engages with the engagement pin 65 of the spool shaft 16, torque from the handle shaft 30 is transmitted to the spool 4. In this state, the clutch is in the on state. On the other hand, when the pinion gear 32 moves outward i.e. toward the handle 2, and the groove 64 of the pinion gear 32 and the engagement pin 65 of the spool shaft 16 are disengaged, the torque from the handle shaft 30 is not transmitted to the spool shaft 16. In this state, the clutch is in the off state. In the clutch off state, the spool 4 will freely rotate.

As shown in FIGS. 2 and 5, the clutch engage/disengage mechanism 19 includes the clutch yoke 70, a yoke engagement member 73 on which two pins 71 are provided, and springs 72. The clutch yoke 70 is disposed around the outer periphery of the pinion gear 32, and is supported by the two pins 71 so as to be movable in a direction along the rotational axis of the spool shaft 16. The clutch yoke 70 will not rotate in association with the rotation of the spool shaft 16. The clutch yoke 70 includes a gear engagement portion 70*a* in the central portion thereof, and the neck portion 63 of the pinion gear 32 engages with the gear engagement portion 70*a*. The springs 72 are respectively disposed around the outer peripheries of the two pins 71 between the clutch yoke 70 and the second side cover 7. In other words, the pins 71 extend inside the coils of the spring 72. The clutch yoke 70 is continually urged toward the side plate 9 side of the frame 5 by the springs 72.

With the clutch engage/disengage mechanism 19 described above, when the clutch lever 17 is moved downward, the clutch cam 74 will be rotated by the clutch plate 40. Due to the rotation of the clutch cam 74, the clutch yoke 70 will be pushed outward or toward the handle 2. When this occurs, the engagement between the mesh portion 62 of the pinion gear 32 and the engagement pin 65 of the spool shaft 16 will be released, and the clutch will be in the clutch off state. On the other hand, when the handle 2 is rotated, the clutch cam 74 will rotate relative to the clutch yoke 70 in association with the rotation of the handle shaft 30, by a cam engagement member (not shown in the figures) mounted in an engagement hole 74b of the clutch cam 74. Then, the pushing pressure of the clutch yoke 70 will be released, the mesh portion 62 of the pinion gear 32 and the engagement pin 65 of the spool shaft will engage, and the clutch will be in the clutch on state.

As shown in FIG. 2, the drag mechanism 21 includes a friction plate 75 that is pressed against the main gear 31, and a pressure plate 77 for pressing the friction plate 75 against the main gear 31 with a predetermined amount of force by rotating the star drag 3. The centrifugal brake mechanism 23 includes a brake case 82, a rotating portion 83 that is disposed inside the brake case 82, and sliders 84 that are disposed on the rotating portion 83 across a gap in the circumferential direction. The brake case 82 is detachably mounted by a bayonet structure in a circular opening formed in the side plate 8. The sliders 84 move freely in the radial direction of the rotating portion 83. The casting control mechanism 22 includes a plurality of friction plates 80a and 80b and a cap 81. The friction plates 80a and 80b are disposed on both ends of the spool shaft 16. The cap 81 adjusts the force with which the friction plates 80a and 80b are pressed against the spool shaft 80. The friction plate 80a disposed on one end of the spool shaft 16 is mounted inside the brake casing 82. Further, the friction plate 80b disposed on the other end of the spool shaft 16 is mounted inside the cap 81.

As shown in FIGS. 1 and 2, the handle 2 is disposed on a side of the reel unit 1, and rotates about an axis that is skewed with the axial direction of the fishing rod. The handle 2 includes a plate-shaped arm portion 2a, and knobs 2b that are rotatively mounted to both ends of the arm portion 2a. The outer side surface of the arm portion 2a is smooth and does not have sharp portions or protrusions which project therefrom. Thus, it will be difficult for the fishing line to become caught on it. The knobs 2b are the double handle type.

Structure of the Level Wind Mechanism

The level wind mechanism 15 winds fishing line around the spool 4 while sliding the fishing line in a direction parallel to the axial direction of the spool 4. As shown in FIG. 2, the level wind mechanism 15 includes the spiral shaft 26, a fishing line guide portion 27, a cap member 29, and a guide member 25. The spiral shaft 26 extends from left to right as seen in FIG. 2, in a direction parallel to the spool shaft 16, and is rotatively supported on the reel unit 1 on the side from which fishing line is paid out from the spool 4. Spiral grooves are formed in the outer peripheral surface of the spiral shaft 26.

As shown in FIGS. 3a to 4b, the fishing line guide portion 27 includes a main member 27a, an engagement member 27b that is disposed on the main member 27a and engages the spiral shaft 26, and a tubular member 28. The tubular member 28 is mounted on the main member 27a and capable of being fitted into a fitting hole 27g formed on the main member 27a. The fishing line guide portion 27 reciprocally moves along the spiral shaft 26 in synchronization with the rotation of spool 4.

Figures 3A, 3B:
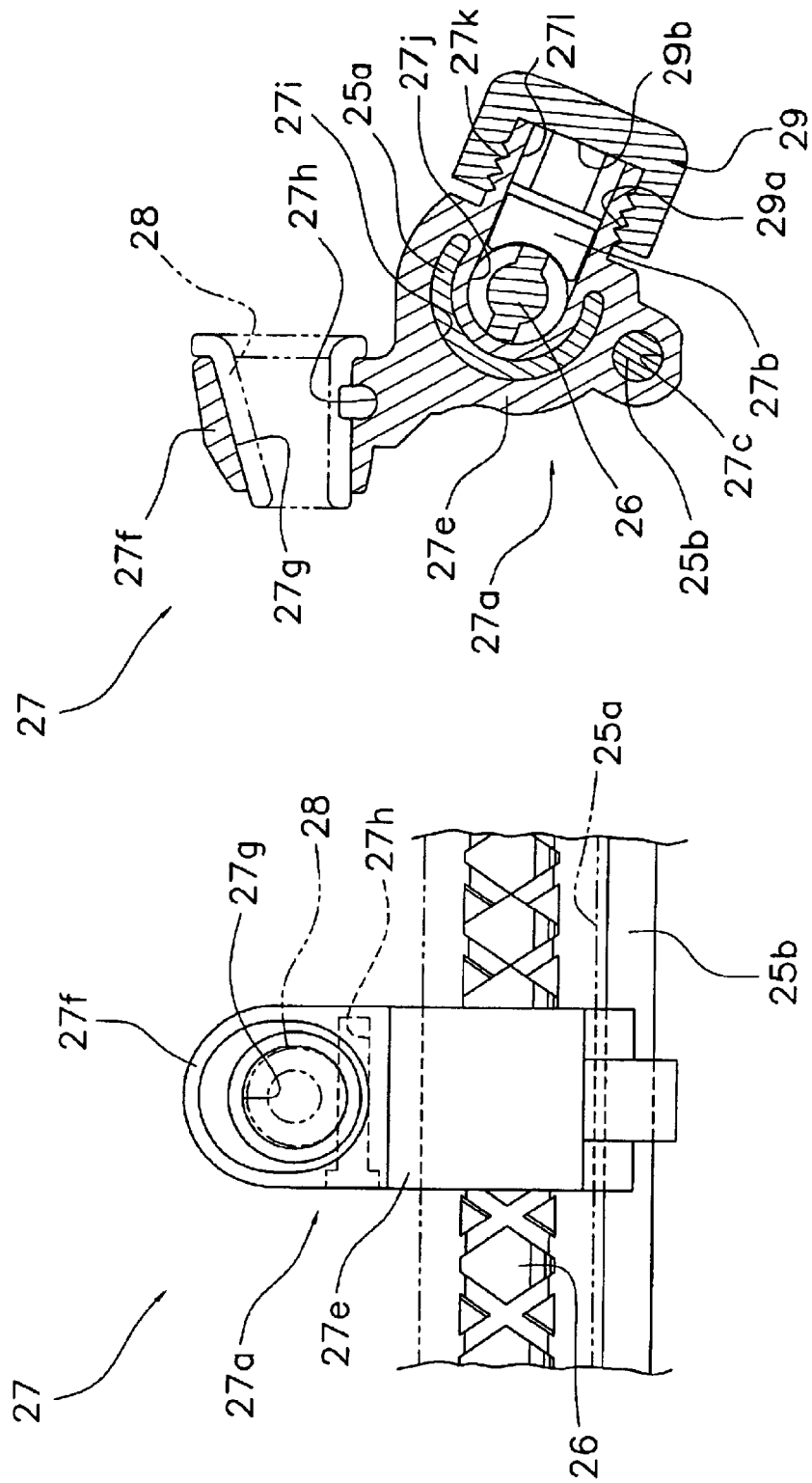
FIG. 3a is an enlarged front cross-sectional view of a fishing line guide portion of a level wind mechanism of the dual bearing reel.
FIG. 3b is an enlarged lateral cross-sectional view of the fishing line guide portion of the level wind mechanism of the dual bearing reel.

The main member 27a includes a moving portion 27e and a projection 27f. The projection 27f is unitarily formed with and projects from an upper portion of the moving portion 27e. The projection 27f extends from the spool 4 side to the side on which fishing line is paid out, and has the fitting hole 27g provided therein. In addition, a screw hole 27h is formed in a lateral surface of the projection 27f. The moving portion 27e has formed therein a first guide hole 27c, a second guide hole 27i, a third guide hole 27j, a male-threaded portion 27k, and a bore 27l. The first through third guide holes 27c, 27i, and 27j are through holes through which a guide rod 25b, a guide tube 25a (to be described below), and the spiral shaft 26 pass respectively. Further, the first through third guide holes 27c, 27i, and 27j extend through the main member 27a parallel to the spiral shaft 26. The guide hole 27c is provided in a lower portion of the moving portion 27e. The male-threaded portion 27k is formed on a lower portion of the moving portion 27e as shown in FIG. 3b. The male-threaded portion 27k is threadedly coupled to a female-threaded portion 29a formed inside the cap member 29. The bore 27l is formed in the male-threaded portion 27k. The bore 27l is connected to the third guide hole 27j. The engagement member 27b is housed within the bore 27l and supported on an inner surface 29b of the cap member 29, such that the engagement member 27b engages the spiral grooves of the spiral shaft 26. The fishing line guide portion 27 moves along the axial direction of the spiral shaft 26 as the spool 4 rotates due to this engagement of the engagement member 27b and the spiral shaft 26.

Figure 4B:
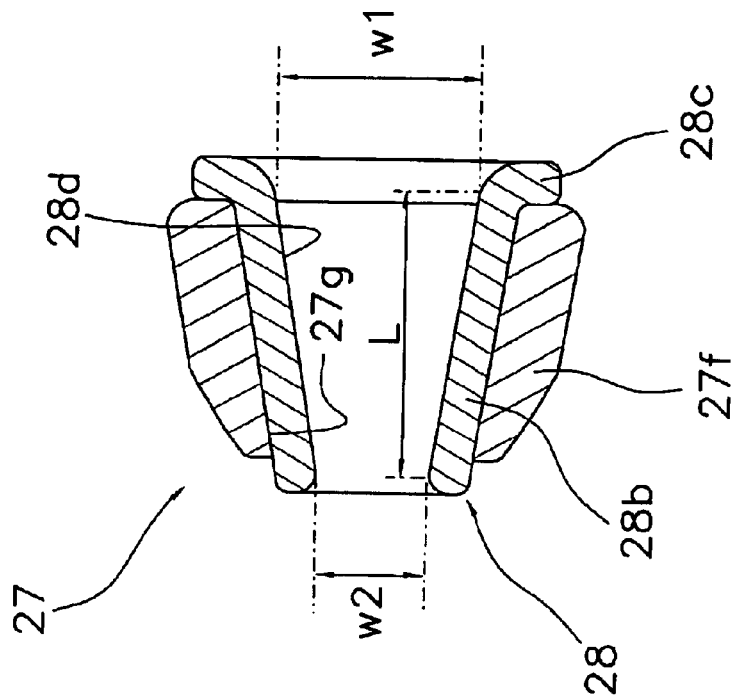
Figure 4A:
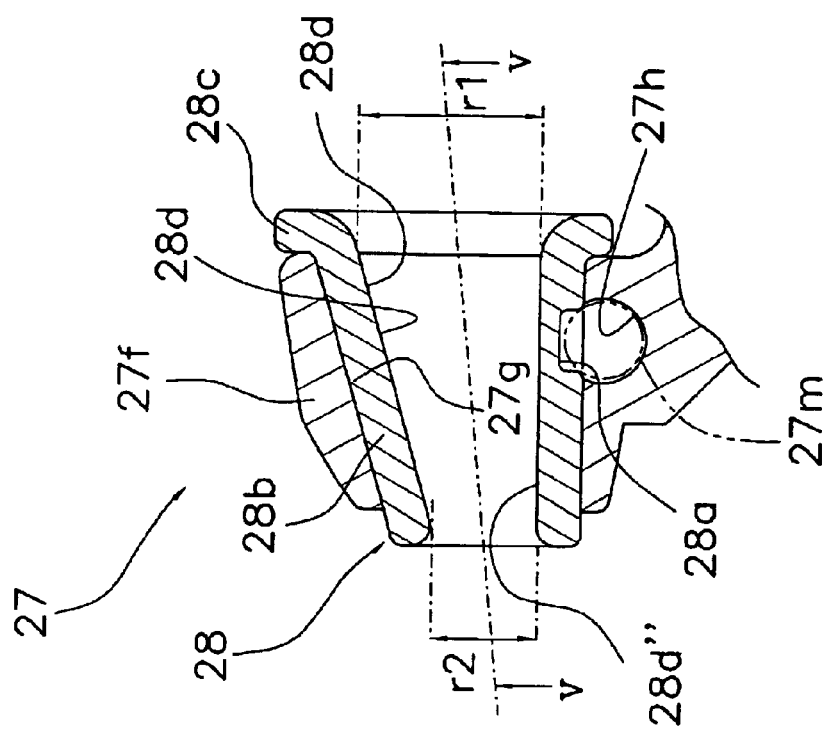
FIG. 4a is a lateral cross-sectional view of a tubular member of the level wind mechanism of the dual bearing reel.

The tubular member 28 is formed from, for example, a ceramic or a hard stainless alloy. The tubular member 28 includes an engagement portion 28a, a tubular portion 28b and a brim 28c. As shown in FIGS. 4a and 4b, the tubular member 28 is pressed into and mounted in the fitting hole 27g from the spool 4 side toward the side on which fishing line is paid out (from right side to left side as seen in FIGS. 4a–4b). The engagement portion 28a that engages a screw member 27m screwed into the screw bole 27h is provided in the tubular portion 28b. Thus, while engaging the screw member 27m with the engagement portion 28a, the tubular member 28 will be secured in the main member 27a by, for example, the screw member 27m. The screw member 27m can be an Allen screw or the like.

Still referring to FIGS. 4a and 4b, a line guide hole 28d is provided in the tubular portion 28b. The line guide hole 28d is formed into a tapered shape that tapers toward the side from which fishing line is paid out (an example of first side, which is left hand side in FIG. 4a) such that the diameter r1 of the line guide hole 28d on the spool 4 side (an example of the second side, which is the right hand side in FIG. 4a) is larger than the diameter r2 on the side from which fishing line is paid out (the left hand side). FIG. 4b is a cross sectional view of the line guide hole 28d as viewed in the direction of a line V—V in FIG. 4a that connects the centers of the diameters r1 and r2. Widths w1 and w2 are widths of the line guide hole 28d in a direction parallel to the spool shaft 16 oil the side from which fishing line is paid out and on the spool side, respectively. In other words, the line guide hole 28d is preferably smaller on the side farther from the spool 4 than the side closer to the spool 4. In this embodiment since the line guide hole 28d is circular, r1 and w1, and r2 and w2 respectively have the same lengths. In addition, the inner circumferential surface of the upper side (as viewed in FIG. 4a) of the line guide hole 28d is formed into a tapered shape and slanted such that the line guide hole 28d is closer to the fishing rod on the side from which the fishing line is paid out than on the spool 4 side. Furthermore, the side of the inner peripheral surface of the line guide hole 28d closer to the main portion 27e is formed so as to be approximately parallel to the axial direction of the fishing rod. In other words, an upper inner surface 28d' of the line guide hole 28 is slanted at a greater angle of inclination A than a lower inner surface 28d". Here, the inner peripheral edges of the line guide hole 28d are chamfered. As seen in FIG. 3a, the shape of the opening of the line guide hole 28d is round or circular from the side from which the fishing line is paid out to the spool 4 side. Referring again to FIG. 4a, with this line guide hole 28d, the ratio (r2/r1) of the diameter r2 of the line guide hole 28d on the side from which the fishing line is paid out (excluding the chamfered portion) relative to the diameter r1 on the spool 4 side (excluding the chamfered portion) is arranged to be between 0.2 and, but not including, 0.8. Also, the ratio ((r1–r2)/L) of the difference in diameters r1 and r2 (r1–r2) relative to the axial length L of the line guide hole 28d(excluding the chamfered portion) along the central axis of the fishing rod is set to be 0.4 or greater. The brim 28c is unitarily formed with the spool 4 side of the tubular portion 28b, and projects outward in the radial direction on the outer peripheral surface of an end portion of the tubular member 28.

As shown in FIGS. 3a and 3b, the guide member 25 guides the fishing line guide portion 27 in the direction along the spiral shaft 26. The guide member 25 includes a guide tube 25a and a guide rod 25b. The guide tube 25a and the guide rod 25b are fixedly held between the pair of side plates 8 and 9, and are disposed in parallel with the spool shaft 16. The guide tube 25a is formed into a tubular shape, and a long opening is formed in the outer peripheral surface of the guide tube 25a along the axial direction. The spiral shaft 26 is disposed inside the guide tube 25a. Thus, the engagement member 27b of the fishing line guide portion 27 can engage with the spiral shaft 26 from the outside of the guide tube 25a through the opening formed in the guide tube 25a. The guide rod 25b is passed through the guide hole 27c in the axial direction formed in the fishing line guide portion 27, and can freely slide thereon.

Operation of the Dual Bearing Reel and the Level Wind Mechanism

Referring initially to FIGS. 2 and 5, when casting, first the braking force is adjusted to prevent backlash by rotating the cap 81 of the casting control mechanism 22. Next, when the clutch lever 17 is pushed downward and moves along the long hole 9a provided in the side plate 9, the clutch cam 74 rotates via the clutch plate 40, and the clutch yoke 70 of the clutch engage/disengage mechanism 19 is pushed outward. Accordingly, the pinion gear 32 engaged with the clutch yoke 70 is moved outward toward the handle 2. This state is the clutch off state because the engagement between the mesh portion 62 of the pinion gear 32 and the engagement pin 65 of the spool shaft 16 is released. In other words, the rotation from the handle shaft 30 will not be transmitted to the spool shaft 16 in this state, and the spool 4 will rotate freely. Thus, in the clutch off state, when casting is performed while thumbing the spool 4 with a thumb placed on the clutch lever 17, the spool 4 will freely rotate in a direction in which the fishing line is paid out, and the fishing line will be paid out from the line guide hole 28d of the tubular member 28.

Referring now to FIGS. 2–4b, after casting, when the tackle in the water is wound up, thumbing is performed with the left hand while rotating the handle 2 with the right hand. When this occurs, the mesh portion 62 of the pinion gear 32 will be engaged with the engagement pin 65 of the spool shaft 16 (the clutch on state). Accordingly, the torque of the handle 2 will be transmitted to the pinion gear 32 via the handle shaft 30 and the main gear 31, and the spool 4 will rotate. On the other hand, when the handle 2 is rotated, the torque of the handle 2 will be transmitted from the second gear 51 that is non-rotatably coupled to the handle shaft 30 to the first gear 50 that is fixedly attached to the end portion of the spiral shaft 26, and the spiral shaft 26 will rotate. When this occurs, the fishing line guide portion 27 will be guided by the guide member 25, and reciprocally move in the direction along the spiral shaft 26 due to the engagement member 27b engaged with the spiral shaft 26. At this point, the fishing line that is being wound passes from the side from which the fishing line is paid out to the spool 4 side through the line guide hole 28d of the tubular member 28, and the fishing line shifts little by little in the axial direction of the spiral shaft 26 with respect to or transverse to the rotation of the spool 4 while being wound around the spool 4.

When a dual bearing reel described above is used, the fishing line is paid out from the spool 4 side and wound up on the spool 4 side passing through the line guide hole 28d of the tubular member 28 mounted on the fishing line guide portion 27. In such structure, preventing the fishing line from moving within the line guide hole 28d of the fishing line guide portion 27 will be effective in winding fishing line uniformly and accurately the onto the spool 4. Thus, it will be difficult for the fishing line wound onto the spool 4 to become disfigured or tangled. In addition, if the resistance on the fishing line can be reduced in the line guide hole 28d of the fishing line guide portion 27, the fishing line can be smoothly wound onto and paid out from the spool 4.

With the level wind mechanism 15 of the present invention, the line guide hole 28d is formed into a tapered shape which tapers toward the side from which the fishing line is paid out such that the diameter of the line guide hole on the spool 4 side is greater than its diameter on the side from which the fishing line is paid out. Thus, movement of the fishing line on the side from which the fishing line is paid out can be controlled while the fishing line is paid out or wound up. In such structure, when the fishing line is to be wound, it can be led onto the spool 4 in a stable state, and can be uniformly wound onto the spool 4 regardless of the position on the spool 4 at which the fishing line is to be wound. In addition, when the fishing line is to be paid out, the angle of inclination produced in the fishing line between the spool 4 and the line guide hole 28d can be reduced. Accordingly, resistance applied to the fishing line at the line guide hole 28d can be reduced, regardless of the position from which the fishing line is paid out from spool 4. Therefore, the fishing line can be smoothly wound up and paid out.

ALTERNATE EMBODIMENTS (a) In the aforementioned embodiment, an example was illustrated in which the opening of the line guide hole 28d is formed into a round shape. However, the shape of the opening of the line guide hole 28d is not limited to that of the aforementioned embodiment, and may have any shape if the line guide hole 28d is tapered toward the side from which the fishing line is paid out such that the width w1 of the line guide hole 28d on the spool 4 side is larger than the width on the side from which the fishing line is paid out. For example, the shape of the opening of the line guide hole 28*d* may be made into a non-circular elliptical or oval shape which is long from left to right or from top to bottom, and formed into a tapered shape that tapers from the spool side toward the side from which the fishing line is paid out.

(b) In the aforementioned embodiment, an example was illustrated in which the tubular member 28 was secured in the main member 27*a* by means of the screw member 27*m*. However, the method of mounting the tubular member 28 onto the main member 27*a* is not limited to the aforementioned embodiment, and may be any method if the tubular member 28 does not fall out from the main member 27*a*. For example, a female threaded portion may be formed in the fitting hole 27*g* of the main member 27*a*, and by providing a male threaded portion capable of screwing into the female threaded portion on the outer peripheral surface of the tubular member 28, the tubular member 28 may be screwed into the fitting hole 27*g* and mounted to the main member 27*a*. In addition, the tubular member 28 may be secured in the main member 27*a* by fitting the tubular member 28 into the fitting hole 27*g* of the main member 27*a* from the spool side 4 toward the side from which the fishing line is paid out, making the tip of the side of the tubular member 28 from which the fishing line is paid out project from the main member 27*a*, and mounting a securing member such as a C shaped retaining ring on the tubular member 28 that projects outward from the side from which the fishing line is paid out.

(c) In the aforementioned embodiment, an example was illustrated in which the tubular member 28 is formed from a ceramic or a hard stainless steel alloy. However, the material of the tubular member 28 is not limited to the aforementioned embodiment, and may be any suitable material. It is obvious to one of ordinarily skilled in the art from the above disclosure what type of material is suitable for the tubular member.

(d) In the aforementioned embodiment, an example was illustrated in which the spiral shaft 26 rotates by the first gear 50 and the second gear 51 of the rotation transmission mechanism 18 only in the direction in which the spool 4 winds up fishing line. However, a mechanism may be provided that rotates the spiral shaft 26 even in the direction in which the spool 4 pays out fishing line. In this case, the spiral shaft 26 can be rotated in the direction in which the fishing line is paid out through a connecting mechanism that connects to the spool shaft 16.

According to the present invention, with the level wind mechanism of the dual bearing reel, the line guide hole is formed into a tapered shape which tapers toward the side from which the fishing line is paid out such that the width w1 on the spool side is larger than the width w2 on the side from which the fishing line is paid out. Thus, movement of the fishing line on the side from which the fishing line is paid out can be controlled while paying out and winding up the fishing line. Given this structure, when the fishing line is wound, it can be led onto the spool in a stable state, and can be uniformly wound onto the spool on any position on the spool at which the fishing line is wound. In addition, when the fishing line is to be paid out, the angle of inclination produced in the fishing line between the spool and the line guide hole can be reduced, and resistance applied to the fishing line at the line guide hole can be reduced, regardless of the position from which the fishing line is paid out from spool. Accordingly, the fishing line will be smoothly wound up and paid out.

As used herein, the following directional terms "forward, rearward, above, downward, vertical, horizontal, below, and transverse" as well as any other similar directional terms refer to those directions of a reel equipped with the present invention. Accordingly, these terms, as utilized to describe the present invention should be interpreted relative to a reel equipped with the present invention.

Terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the result is not significantly changed. For example, these terms can be construed as including a deviation of at least±5% of the modified term if this deviation would not negate the meaning of the word it modifies.

This application claims priority to Japanese Patent Application No. 2003-015151. The entire disclosure of Japanese Patent Application No. 2003-015151 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A level wind mechanism for a fishing reel configured to guide fishing line onto a spool while moving the fishing line in a direction parallel to a rotational axis of the spool, said level wind mechanism comprising:
   a spiral shaft having spiral grooves in an outer peripheral surface thereof, said spiral shaft extending in a direction parallel to the rotational axis of the spool and being rotatively supported by a reel unit adjacent to the spool;
   a fishing line guide portion being configured to move reciprocally along said spiral shaft in synchronization with rotation of the spool at least when the spool winds the fishing reel, said fishing line guide portion having a main member,
      an engagement member being provided on said main member and configured to engage said spiral shaft, and
      a tubular member having a line guide hole through which the fishing line passes, said line guide hole being formed to taper toward a first side from which the fishing line is paid out, and
   a guide member disposed extending in a direction along said spiral shaft to guide said fishing line guide portion in a direction along said spiral shaft,
   wherein said line guide hole is tapered such that its width in a direction parallel to said spiral shaft is smaller on the first side.

2. The level wind mechanism according to claim 1, wherein
   said line guide hole is tapered such that its upper inner surface is slanted at a greater angle of inclination than its lower inner surface.

3. The level wind mechanism according to claim 2, wherein
   the lower inner surface of said line guide hole is at least partially adapted to be substantially parallel with an axial direction of a fishing rod.

4. The level wind mechanism according to claim 1, wherein said line guide hole is circular in shape.

5. The level wind mechanism according to claim 4, wherein a ratio of a diameter of said line guide hole on the first side to a diameter of said line guide hole on a second side is greater than or equal to 0.2 and less than 0.8, the second side being an opposite side from the first side.

6. The level wind mechanism according to claim 4, wherein a ratio of a difference between a diameter of said line guide hole on the first side and a diameter of said line guide hole on the second side to an axial length of said line guide hole is 0.4 or greater.

7. The level wind mechanism according to claim 1, wherein an inner peripheral surface of said line guide hole is at least partially adapted to be substantially parallel with an axial direction of a fishing rod.

8. The level wind mechanism according to claim 1, wherein said line guide hole is at least partially chamfered.

9. The level wind mechanism according to claim 1, wherein said main member has a screw hole formed therein, and said tubular member has an engagement portion, said tubular member being secured to said main member by a screw member engaging said engagement portion and said screw hole.

10. A dual bearing fishing reel comprising:

a reel unit being adapted to be mounted to a fishing rod;

a spool being rotatively attached to said reel unit, said spool being configured to have fishing line wound around an outer periphery thereof; and a level wind mechanism being configured to guide fishing line onto said spool while moving the fishing line in a direction parallel to a rotational axis of said spool, said level wind mechanism having a spiral shaft having spiral grooves in an outer peripheral surface thereof, said spiral shaft extending in a direction parallel to said rotational axis of said spool and being rotatively supported by said reel unit adjacent to said spool, a fishing line guide portion being configured to move reciprocally along said spiral shaft in synchronization with rotation of said spool at least when said spool winds the fishing reel said fishing line guide portion having a main member, an engagement member being provided on said main member and configured to engage said spiral shaft, and a tubular member having a line guide hole through which the fishing line passes, said line guide hole being formed to taper toward a first side from which the fishing line is paid out, and a guide member disposed extending in a direction alone said spiral shaft to guide said fishing line guide portion in the direction along said spiral shaft, wherein said line guide hole is tapered such that its width in a direction parallel to said spiral shaft is smaller on the first side.

11. The dual bearing fishing reel according to claim 10, wherein said line guide hole is tapered such that its upper inner surface is slanted at a greater angle of inclination than its lower inner surface.

12. The dual bearing fishing reel according to claim 11, wherein the lower inner surface of said line guide hole is at least partially adapted to be substantially parallel with an axial direction of a fishing rod.

13. The dual bearing fishing reel according to claim 10, wherein said line guide hole is circular in shape.

14. The dual bearing fishing reel according to claim 13, wherein a ratio of a diameter of said line guide hole on the first side to a diameter of said line guide hole on a second side is greater than or equal to 0.2 and less than 0.8, the second side being an opposite side from the first side.

15. The dual bearing fishing reel according to claim 13, wherein a ratio of a difference between a diameter of said line guide hole on the first side and a diameter of said line guide hole on the second side to an axial length of said line guide hole is 0.4 or greater.

16. The dual bearing fishing reel according to claim 10, wherein an inner peripheral surface of said line guide hole is at least partially adapted to be substantially parallel with an axial direction of the fishing rod.

17. The dual bearing fishing reel according to claim 10, wherein said line guide hole is at least partially chamfered.

18. The dual bearing fishing reel according to claim 10, wherein said main member has a screw hole formed therein, and said tubular member has an engagement portion, said tubular member being secured to said main member by a screw member engaging said engagement portion and said screw hole.

* * * * *